(12) United States Patent
Todasco et al.

(10) Patent No.: US 10,264,050 B2
(45) Date of Patent: Apr. 16, 2019

(54) PREDICTIVE ANALYSIS OF COMPUTING PATTERNS FOR PRELOADED DATA TO REDUCE PROCESSING DOWNTIME

(71) Applicant: PAYPAL, INC., San Jose, CA (US)

(72) Inventors: Michael Charles Todasco, Santa Clara, CA (US); Cheng Tian, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 72 days.

(21) Appl. No.: 15/284,333

(22) Filed: Oct. 3, 2016

(65) Prior Publication Data

US 2018/0097905 A1 Apr. 5, 2018

(51) Int. Cl.
*H04L 29/08* (2006.01)
*H04L 12/26* (2006.01)
*H04W 4/21* (2018.01)

(52) U.S. Cl.
CPC .......... *H04L 67/02* (2013.01); *H04L 43/0811* (2013.01); *H04L 67/22* (2013.01); *H04L 67/2847* (2013.01); *H04W 4/21* (2018.02)

(58) Field of Classification Search
CPC ...... G06Q 20/40; G06Q 20/322; G06Q 20/32; G06Q 20/327; G06Q 20/3674; G06Q 20/3829; G06Q 20/3224; G06Q 20/36; G06Q 20/367; G06Q 20/4014; G06Q 30/06; G06Q 20/10; G06Q 20/12; G06Q 20/18; G06Q 20/20; G06Q 20/204; G06Q 20/3223; G06Q 20/325; G06Q 20/382; G06Q 20/385; G06Q 20/401; G06Q 20/405; G06Q 30/0641; G06Q 20/02; G06Q 20/045; G06Q 20/0453; G06Q 20/08; G06Q 20/105; G06Q 20/145; G06Q 20/202; G06Q 20/206; G06Q 20/223; G06Q 20/3229; G06Q 20/3255; G06Q 20/3274; G06Q 20/3276; G06Q 20/363; G06Q 20/3821; G06Q 20/38215; G06Q 20/383; G06Q 20/40145;
(Continued)

(56) References Cited

U.S. PATENT DOCUMENTS 6,473,738 B1 * 10/2002 Garrett .................. G06Q 30/02
705/26.8
7,225,156 B2 * 5/2007 Fisher ................... G06Q 20/02
235/379

(Continued)

*Primary Examiner* — Greg C Bengzon
(74) *Attorney, Agent, or Firm* — Haynes and Boone, LLP

(57) ABSTRACT

There are provided systems and methods for predictive analysis of computing patterns for preloaded data to reduce processing downtime. A user may utilize a computing device to interact with a service provider over a network connection, for example, to utilize one or more services or processes of the service provider. Based on the user's actions and/or historical data for the user, the service provider may determine potentially required data and/or processes of the user. The service provider may preload the data or processes, for example, by storing data to the communication device's cache or by executing some of the processes. The service provider may preload data to the communication device while the communication device has available bandwidth or network connectivity so that the data is available in an offline environment. Processes may be executed before requirement by the user during times of low processing load.

20 Claims, 5 Drawing Sheets

(58) Field of Classification Search
CPC .... G06Q 20/42; G06Q 2220/00; G06Q 30/02;
G06Q 30/0267; G06Q 30/0639; G06Q
40/02; G06Q 20/3226; G06Q 20/3227;
G06Q 20/3278; G06F 11/3003; G06F
11/3051; G06F 11/3089; G06F 11/3438;
G06F 11/3466; G06F 17/30873; G06F
17/30893; G06F 1/3212; G06F 9/485;
H04L 67/02; H04L 29/0881; H04L 67/18;
H04L 67/22; H04L 67/2847; H04L
67/2852; H04L 67/2876; H04L 67/306;
H04L 67/325; H04L 29/06; H04L
29/08837; H04L 41/069; H04L 41/0893;
H04L 41/147; H04L 41/50; H04L 43/08;
H04L 43/0894; H04L 47/193; H04L
47/20; H04L 47/286; H04L 61/103; H04L
61/1511; H04L 61/2084; H04L 63/0281;
H04L 63/0421; H04L 63/0428; H04L
63/06; H04L 63/08; H04L 63/0838; H04L
67/04; H04L 67/10; H04L 67/1095; H04L
67/14; H04L 67/148; H04L 67/26; H04L
67/28; H04L 67/2861; H04L 67/42; H04L
69/321; H04L 69/329; H04L 43/0811;
H04W 4/18; H04W 12/02; H04W 12/06;
H04W 24/04; H04W 28/02; H04W
28/0221; H04W 28/0226; H04W 28/06;
H04W 36/0011; H04W 36/0027; H04W
36/12; H04W 36/14; H04W 36/165;
H04W 36/18; H04W 36/22; H04W 4/00;
H04W 4/02; H04W 4/21; H04W 4/80;
H04W 80/00; H04W 88/06; H04M
1/72522; H04M 1/72552; H04M 2250/12
See application file for complete search history.

(56) References Cited

U.S. PATENT DOCUMENTS

| | | | | |
|---|---|---|---|---|
| 7,809,608 B2* | 10/2010 | Kassan | ............ | G06Q 20/4012 705/12 |
| 8,260,657 B1* | 9/2012 | Conway | ............ | G06Q 30/02 380/231 |
| 8,370,258 B2* | 2/2013 | Roberts | ............ | G06Q 20/10 705/1.1 |
| 8,423,414 B2* | 4/2013 | De Araujo | ............ | G06Q 20/20 705/16 |
| 8,985,445 B2* | 3/2015 | Patel | ............ | G06Q 20/02 235/375 |
| 9,349,112 B2* | 5/2016 | Gazdzinski | ............ | G06Q 10/08 |
| 9,652,137 B2* | 5/2017 | Guan | ............ | G06F 3/04842 |
| 9,824,408 B2* | 11/2017 | Isaacson | ............ | G06Q 20/12 |
| 9,934,501 B1* | 4/2018 | Catoe | ............ | G06Q 20/208 |
| 10,062,072 B2* | 8/2018 | Davis | ............ | G06Q 20/085 |
| 2002/0152175 A1* | 10/2002 | Armstrong | ............ | G06Q 20/382 705/64 |
| 2003/0065643 A1* | 4/2003 | Musgrove | ............ | G06F 17/30864 |
| 2006/0175403 A1* | 8/2006 | Fossen McConnell | ............ | G06Q 30/02 235/385 |
| 2011/0145092 A1* | 6/2011 | Paradise | ............ | G06Q 30/02 705/26.35 |
| 2011/0178897 A1* | 7/2011 | Balasubramanian | .. | G06Q 20/12 705/27.1 |
| 2011/0251892 A1* | 10/2011 | Laracey | ............ | G06Q 30/0253 705/14.51 |
| 2012/0289147 A1* | 11/2012 | Raleigh | ............ | H04L 67/2847 455/3.06 |
| 2013/0238455 A1* | 9/2013 | Laracey | ............ | G06Q 20/108 705/21 |
| 2014/0052617 A1* | 2/2014 | Chawla | ............ | G06Q 20/12 705/39 |
| 2014/0373032 A1* | 12/2014 | Merry | ............ | G06F 9/54 719/328 |
| 2015/0242941 A1* | 8/2015 | Viswanath | ............ | G06Q 20/40145 705/26.8 |
| 2015/0245108 A1 | 8/2015 | Pfeffer et al. | | |
| 2016/0005024 A1* | 1/2016 | Harrell | ............ | G06Q 20/12 705/39 |
| 2016/0092867 A1 | 3/2016 | Salama et al. | | |
| 2016/0125377 A1* | 5/2016 | Boncimino | ............ | G06Q 20/202 705/21 |
| 2016/0171495 A1* | 6/2016 | Shah | ............ | G06O 30/0613 705/44 |
| 2016/0277776 A1 | 9/2016 | Park et al. | | |
| 2017/0262833 A1* | 9/2017 | Xing | ............ | G06Q 20/023 |

* cited by examiner

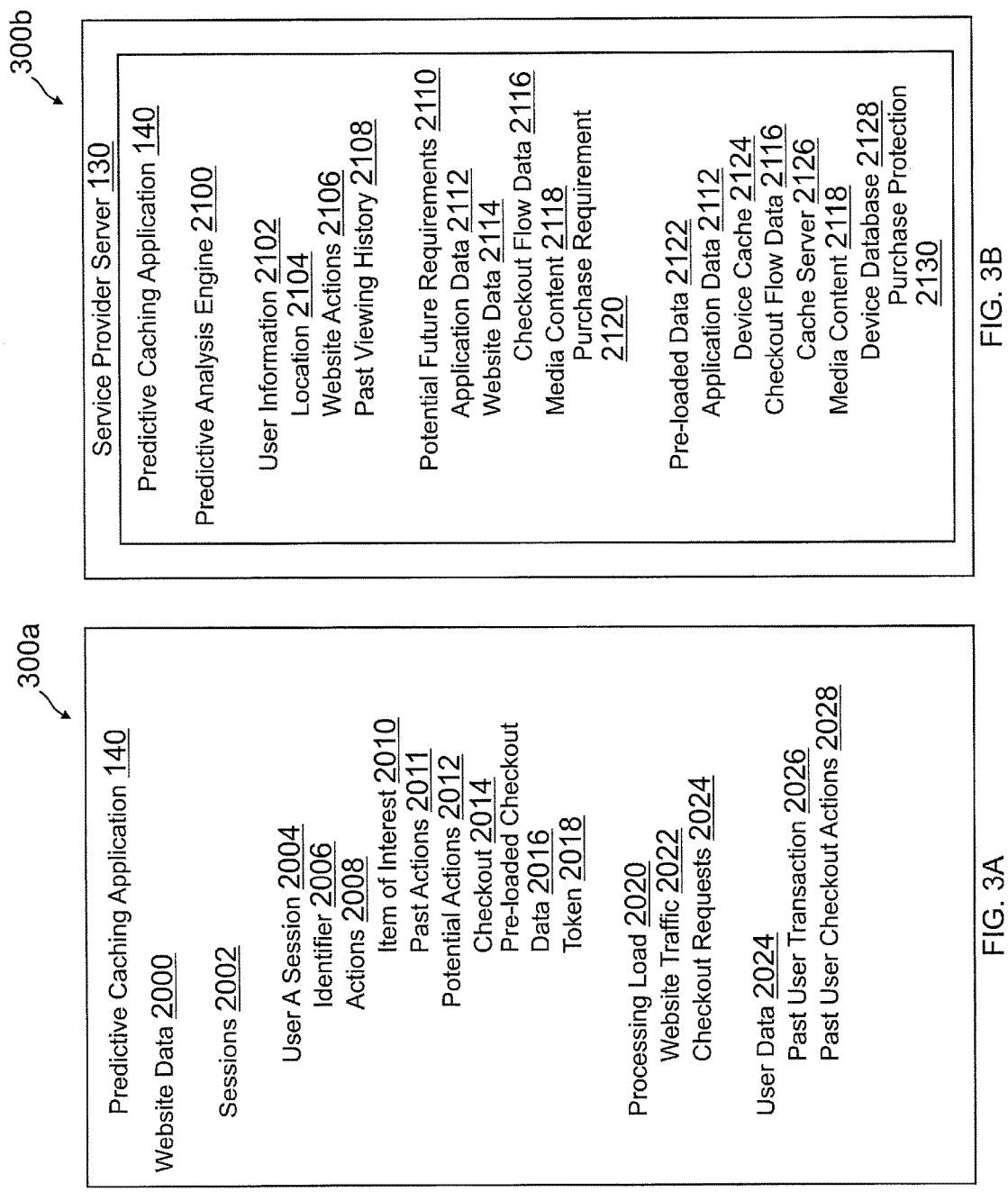

US 10,264,050 B2

PREDICTIVE ANALYSIS OF COMPUTING PATTERNS FOR PRELOADED DATA TO REDUCE PROCESSING DOWNTIME

TECHNICAL FIELD

The present application generally relates to preloaded data to caches and databases and more specifically to predictive analysis of computing patterns for preloaded data to reduce processing downtime.

BACKGROUND

Various types of service providers may provide one or more online services and/or resources to users, merchants, and different entities. The types of online services may include transaction processing services to purchase one or more items, for example, through a transaction processing or checkout flow provided by the service provider. Additionally the services may be associated with a mobile application, such as a social networking, mapping, video game, or other type of mobile application. Other types of services may include media playback, such as streaming services and/or downloading of digital media. However, each online service requires processing power by the online service and data transfer capabilities between the online service and the user's computing device. Thus, in times of high processing demand on the service provider, requests for processing by the device with the service provider may be delayed. For example, serving and processing dynamic data on a webpage, such as performing a transaction processing flow, may be delayed or entirely unavailable where the service provider's resources are tied up with other computing processes. Moreover, where the device loses network connectivity, or the device has low bandwidth or requires payment for use of bandwidth and/or data transfer, downloading of data to a device may not be preferable or possible.

BRIEF DESCRIPTION OF THE DRAWINGS

FIG. 3A is an exemplary application environment displaying application data for preloaded dynamic data for transaction processing within a website checkout interface, according to an embodiment;

FIG. 3B is an exemplary system environment having a service provider server executing a predictive analysis application for determination of preloaded data required by a user to reduce processing downtime by the user's device, according to an embodiment;

Figure 1:
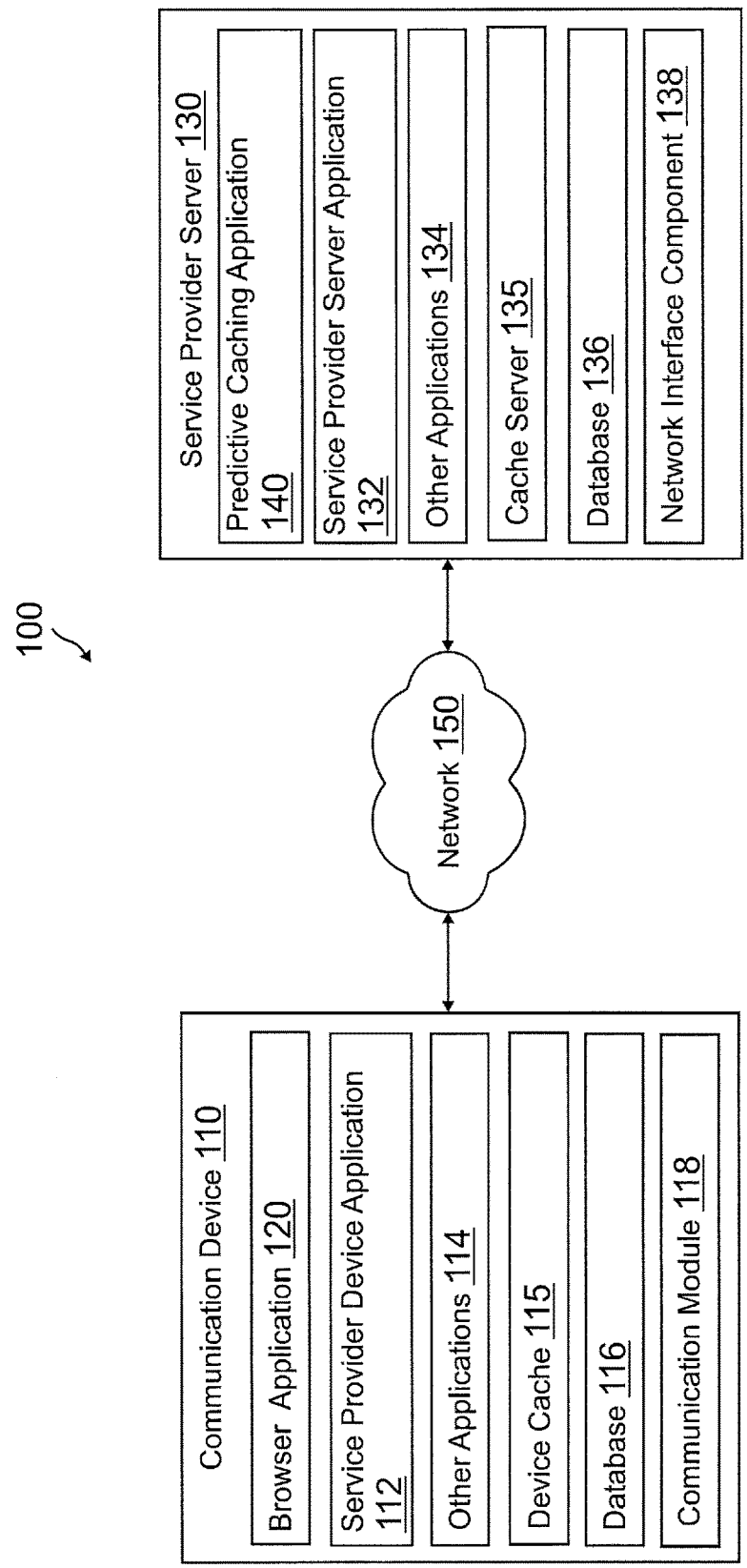
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for predictive analysis of computing patterns for preloaded data to reduce processing downtime. Systems suitable for practicing methods of the present disclosure are also provided.

In various embodiments, a service provider may preload content onto a user device based on various detected conditions or predictions that may prevent or limit content downloading at a later time. For example, when there is an upcoming predicted coverage loss or limited network connectivity, specific content may be preloaded and stored on the user device. The specific content may be based on the content the user is currently accessing or what the user may want to see during the times of no or low connectivity. Content may also be preloaded when the device is detected as having low power and predicted to not have access to recharging. In a further example, a user traveling in a car other vehicle may be predicted to be traveling into areas of low or no network connectivity, which can be based on crowdsourcing or other ways to determine network connectivity along a travel path, which can be for a specific data carrier for the user device. When the user is predicted as needing content during such an area, predicted content may be preloaded, such as a group of songs, subsequent pages of an audio book, etc. The decision whether to preload can be based on relative connectivity between areas along the travel route, such that even though a current area may have low connectivity, a preloading of content may occur because an upcoming area is predicted to have no connectivity. As such, content may be preloaded at a user home or office with WiFi coverage when the system predicts the user will be traveling and only have access to 4G or even lower network connectivity. Consequently, the user may be able to access desired content without the inconvenience of having to wait for later downloads, much less waiting until the user is able to download the desired content at a later time or location.

One or more entities, such as personal users or consumers, groups of users, merchants, businesses, or other commercial or governmental agencies, may access and/or interact with one online service provider to utilize one or more of the services provided by the service provider. For example, a user may wish to provide a payment to an entity (e.g., another user, merchant, business, etc.) for a transaction, such as a purchase of one or more items, a bill payment, or other type of required payment or transfer of money between two parties interacting to conduct business or engage in a commercial transaction. Thus, various service providers may provide transaction processing services that may allow two or more entities to engage in transaction processing for a transaction. For example, a payment provider service may offer transaction processing services that provide transfers, payment services, reimbursement or refund services, and other type of financial services including payment account establishment and/or management. Other types of service providers may provide different services to users, including providing application data for mobile applications, such as a mapping or GPS application, a social networking application, a microblogging application, a video game application, a messaging or email application including text messaging or instant/direct messaging, a media sharing application, and/or a media content provider application (e.g., audio, visual, and/or audiovisual content that may be played back to the user on a device).

In various embodiments, a user may be required to establish an account with the service provider in order to utilize the services provider's services. For example, a user may be required to provide personal information or other types of identification information including a name, address, and/or other information. The user may also be required to provide financial information, including payment cards (e.g., credit/debit cards), bank account information, gift cards, and/or benefits/incentives. In order to create an account, each user may be required to select an account name and/or provide authentication credentials, such as a password, personal identification number (PIN), answers to security questions, and/or other authentication information. Once an account is created, the account may be accessed through a web browser from a website of the service provider and/or a dedicated application of the service provider, such as a mobile smart phone application.

In various embodiments, the account may be utilized to access and use the features of the service provider, such as digital wallet services of a transaction processor service, which may offer financial services to send, store, and receive money, process financial instruments, and/or provide transaction histories. Thus, the accounts may store information associated with each user, including past user actions and/or historical data for the user including browsing information, session data for one or more sessions of use of the service provider by the user, wish/shopping lists, transaction processing information, and/or other types of historical information for the user. Moreover, the service provider may accrue historical information for a plurality of users, including all users of the service provider or a subset of similar users to the user, using the account and/or historical information. However, in other embodiments, the service provider may not provide account services, but may identify the user through a user or device identifier for the user or user's device, respectively. In such embodiments, the identifier may be stored with user information, including the aforementioned actions, session data, transaction processing information, etc. In further embodiments, the service provider may not be required to identify the user, and may instead store historical information on application/service usage of the service provider, network information including connectivity information, past user actions and/or session data (e.g., data on the user's use of the application/service for a session of use of the service provider by a particular identifier/user), telecommunication carrier data, and/or other information related to use of the service provider.

In this regard, a computing device of a user may further include one or more applications including web browser applications, dedicated applications of the service provider, mobile applications associated with the service provider or a merchant using the service provider, and/or other processing applications or features. In various embodiments, a website may provide the services of the service provider, and thus may be accessed by a web browser application. The application (or website) may be associated with a transaction processor and/or payment provider, such as PayPal® or other online payment provider service, which may provide payments and the other aforementioned transaction processing services on behalf of user, merchants, and other entities. The web browser may also access other service providers, including the aforementioned mapping or GPS, a social networking, a microblogging, a video game, a messaging or email including text messaging or instant/direct messaging, a media sharing, and/or a media content provider service. In other embodiments, a dedicated application, such as a standalone application for a specific service provider, may instead access the service provider over a network and utilize the service provider's services and features. The application may execute on the computing device for a user, and may provide various functionalities and processes to the user.

However, web browsers and dedicated applications require both processing to be done by the service provider, such as processing spread across one or more devices or servers of the service provider, as well as network connectivity to use the service provider. For example, when using website services, one of more servers for the service provider may provide website data to the user's device over a network connection with the user's device. In various embodiments, the website services of the service provider may also correspond to processes and/or features embedded into a website of another entity, such as a merchant. In such embodiments, a merchant website may provide a transaction processing and checkout flow through the merchant website, where the flow is provided by the service provider, for example, through embedding website data of the service provider to the merchant's website and/or configuring a process to utilize the service provider's server processing to process transactions. In this regard, the website for the service provider to provide transaction processing and/or the checkout flow within another website to provide transaction processing may require static data for presentation of the website/flow to the user through the user's device, as well as dynamic data. Instead of a website, a dedicated application of the transaction processor and/or merchant may function similarly and require static and/or dynamic data. Static data may correspond to HTML script, graphic images including animated graphics that remain constant, text, downloadable data or objects, media content, and other data that does not change between iterations of serving the data to the user, which may include static fields and/or menus for input/selection of data. Such static data may be stored on the service provider's servers, or may be stored on one or more content delivery networks (CDNs) associated with the service provider in order to reduce server load of the service provider in transmitting the data to the user's device during processing with the user's device.

However, dynamic data or content may change based on every user or a group of user's use of the service provider's services, such as the website or flow. The dynamic data may require processing power of the service provider's servers in order to process incoming input or changeable parameters (e.g., time, cost, tax, shipping information, discounts, etc.), determine resulting output data, and/or serve the information to the user. Thus, processing dynamic data may require server resources, including processing power, database accessibility and/or data retrieval, caching of relevant data for use in application processing, and/or other processing requirement. Part of the dynamic data may include processing a transaction for a user between the user and a merchant, for example, to purchase an item through the transaction processor's website/dedicated application and/or through the checkout flow provided elsewhere (e.g., in the merchant's website and/or dedication application). In this regard, processing and generating dynamic data may therefore put a processing load on the server. As multiple processing requirements are requested by the server, including other requests for processing of dynamic data, database transactions, and other types of server processing, the processing load on the server may increase. When the processing load is low, the service provider's servers may be able to easily serve data; however, high server loads may cause the service provider's server to lag when sending and/or receiving data and performing processing, including timing out causing no data to be sent, received, and/or processed for certain users. The service provider may determine potential time periods and/or peaks in server usage by users by analyzing past historical data for usage of the service provider. For example, Black Friday may be a period of high shopping, where multiple users may require transaction processing. Similarly, based on a number hits of visits over a time period (e.g., the last 5 minutes), the service provider may determine website traffic and potential requirements for processing. Other types of usage history and/or past processing loads of the service provider may be used for predictive analysis of when the service provider's servers may be under high or low loads. This may vary depending on server operating efficiency and what the type/size of the content the user is predicted as needing. For example, a low load condition may be when the system determines the predicted content can be downloaded within X seconds, while a high load condition may take 10× seconds. In other embodiments, the low or high load condition may be determined as falling below, meeting, or exceeding a threshold level or percentage of used system resources, such as 90% processing resources, etc.

Thus, when a user accesses a website or dedicated application, the user may perform one or more actions. The actions may indicate a potential future action of the user, such as a next page visit by the user, request for data and/or data processing by the user (e.g., entry of input by the user to one or more website/application fields), and/or indication of an item of interest to the user to purchase. Based on the user's actions, the service provider may determine a potential future action that the user may take, for example, a potential future request in content to be served from the service provider to the user's device. The content may correspond to website data, such as a checkout interface from the website/flow, which may include dynamic data required to be processed for the server provided. For example, the content may correspond to one or more API calls between the service provider's applications to perform tasks, such as process input data and return data to the user. The API calls may occur pre-checkout or at checkout for an item that the user wishes to purchase in order to present a checkout interface for the user to purchase the item and/or process a transaction for purchase of the item. Thus, in times of low server load where the service provider predicts that the user will request the content at a future time (e.g., within the next few seconds/minutes), the service provider may preload the data or pre-execute the processes required by the user at the future time when the user requests the data. This may allow the service provider to provide the data to the user's device during high server load with minimal requirements. Since static data may easily be served by a CDN, the dynamic data or content may be preloaded. Additionally, the content may be stored to a cache on the server, or may be stored to a cache server configured to store the content to a cache or quickly retrievable database and serve the data to the user. Once the content is stored to a quickly retrievable hardware and/or software storage component, the content may be associated with a digital token, such as an identifier that may be unencrypted, randomized, and/or encrypted. The token may be provided to the user's device and associated with the potential future request for the content, where the user's device may return the token to the service provider in order to retrieve the preloaded data and/or executed API calls and provide the data through the website/flow process.

The content may be preloaded based on the user's actions and/or historical data for the user, such as past user purchases, purchasing patterns, transaction history, and/or browsing history. For example, predictive analysis of future user actions may be performed through analysis of past user historical data for the user. Additionally, the content may be preloaded based on a prediction of future high server load, which may occur when the user is predicted to request the content. In further embodiments, the service provider may perform predictive analysis on a plurality of users, such as all users of the service provider, and may determine one or more actions taken by the other users after performing the same or similar action that the user performed. Thus, similar past users to the user may be determined, where the similar past users are used to predict the user's next or subsequent action(s) after performing some action (e.g., the direct next action or an action further down the line at a future time or in a future process). Thus, if the user does elect to perform the future action, the device of the user may detect the action and retrieve the token from storage by the device. The token may then cause the service provider server's cache or cache server associated with the service provider to retrieve the preloaded data and quickly server the data to the user even in times of high processing load and/or server demand on the service provider. In further embodiments, instead of a token, the preloaded website data and/or pre-executed processes may instead be stored to a device side cache for the device of the user. In such embodiments, the preloaded data may be transmitted by the device back to the service provider's servers and inserted into a webpage of the website, interface of an application, and/or one or more fields, menus, or options of a checkout flow provided in a website/application of another entity.

Additionally, other types of service providers may also preload data based on user historical data for a user, location historical data for a location of the user and/or a nearby location that the user is travelling to or may visit, network connectivity data associated with the location or nearby location, and/or current user actions by the user. For example, a mapping or GPS application, a social networking application, a microblogging application, a video game application, a messaging or email application including text messaging or instant/direct messaging, a media sharing application, a media content provider application and/or other type of device application, including mobile device applications, may wish to store data to a device side cache of use during low or no network connectivity. The required data may correspond to data utilized within the application, including mapping data and/or directions (including audio output direction and/or coordinates), social networking data including feed data and posts, media content (e.g., audio, visual, and/or audiovisual content), processing data and/or processed data, messages and emails, or other required data for processing by the application and/or output using the application. Such requirements for data may occur at an operating system level, for example, for all applications executing on a mobile device, or may be application specific to a particular mobile application executing on the device (e.g., based on preferences set by the user and/or use by the user). In this regard, predictive analysis may be utilized to determine potentially required content, such as a prediction for a request or requirement for application data within an application at a future time and/or location.

For example, past user actions within an application may be used to indicate if and when a user may request application data, such as viewing a social networking application or input of a destination location requiring directions to the location. Similarly, other user actions may be used to determine whether the user may require data, such as if the other user typically requires specific data at a certain time or location, of if the other user's subsequent actions after performing an action are similar to the user's action(s). The requirement for preloaded data may also be determined based on network connectivity at a location of the user or that the user is going to visit and/or at a future time. For example, if the location of the user has network connectivity that is low or connects and disconnects frequently, it may be determined to preload data onto the user's device during network connectivity that the user may require at a future time based on the user's actions.

Similarly, a coverage map and/or coverage times/network outage times for a telecommunication carrier or network access provider for the user's device may be used by the service provider with user information to determine whether data may be required to be preloaded to the user's device in a cache. For example, using the coverage information, the service provider may determine that the user is travelling to an area (e.g., indicated through a destination location, travel route, past travel history, and/or schedule) with low or without network connectivity and/or if the user will be using their device at their location or the future location during a network outage period. Thus, the service provider may determine that data required by the user at the location/time should be preloaded to the user's device. Moreover, the information about whether the user will have network connectivity or whether network connectivity for the user's device will be low or not provided may be crowd-sourced from other users that have previously visited the area. Once the potential future requirement in content is determined for the user, the service provider may retrieve the content. The content may then be transmitted to the user device during a time of network connectivity, where the content is stored to a cache or database of the device. Thus, when the user requests the content, the content may be provided to the user's device even where the user's device does not have network connectivity.

In other embodiments, the user may wish to receive, stream, download, or otherwise access online media content that may be bandwidth intensive and/or require large amounts of data to be downloaded or streamed to the user's device. For example, users may watch movies, television shows, online user generated content, or other media content, or may play video games or engage in virtual reality experiences on a device. Such actions may require large amounts of bandwidth to stream and/or have large data package sizes, for example, multiple gigabyte file sizes. The user may wish to consume such media on a mobile device, such as a mobile smart phone or tablet computer. However, where no or low network connectivity and/or signal strength is available, the user may be unable to view the media. Similarly, where network connectivity may require purchase, payment, or use available data transfer amounts purchased by the user, downloading or streaming may not be preferable. Thus, the service provider may perform predictive analysis on past media viewing habits, interests, wish/shopping lists of media, media viewing queues, playlists, and/or other media related information for the user to determine a potential media content that the user may view on a device at a future time, for example, within the next few hours or day. The user viewing habits, purchases, and/or watch list may indicate that the user may watch another similar media content, such as the next television show in a season of a show watched by the user or a sequel to a movie watched by the user. Similarly, if the user has a music playlist or has downloaded a video game, the user may wish to listen/play the media content. Whether the user may wish to consume the media content may also be based on past user actions and/or a schedule for the user. In this regard, if the user usually watches a television show on the bus to work or listens to a playlist at the gym, the service provider may determine that the user may wish to consume one or more media contents at a future time.

Thus, the service provider may predictively determine the content that the user may consume at a future time and prepare the content for loading to a cache or database of the user's device. The service provider may provide copyright protection and content management restrictions on the media content, for example digital rights management (DRM) protection to the media content. Moreover, where the content requires purchase before viewing or otherwise consuming, the service provider may also provide purchase protection on the media content that locks the media content from being consumed prior to the user authorizing a transaction to purchase the media content from the service provider or other merchant even though the content has been preloaded onto the user device. The media content may then be loaded to the user's device for playback on the user's device. The media content may be loaded during a specific network connection, such as a network connection having high bandwidth, free data transfer, or inexpensive data transfer, such as a home or work WiFi network that the user has connected to. The service provider may predictively load the content during the preferred network connection, which may be set by the user or predictively selected by the service provider based on past available networks, so that the user may view the media content with another or no network connection. Where the user is required to purchase the content, the user may select to purchase the content, and the user's payment token, credentials, and/or authorization may be sent to the service provider for transaction processing. If no network connection is available during purchase, such transaction processing information for the user may be stored to the user's device securely, and transmitted to the service provider on reconnection to a network. The service provider may also receive an indication of the purchase by the user with or without the transaction processing information to reduce fraud by knowing which users/devices have purchased preloaded content.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110 and a service provider server 130 in communication over a network 150. The user or other entity (not shown) may utilize communication device 110 to utilize the various features available for communication device 110, which may include processes and/or applications associated with service provider server 130, including requirements for content or other data from service provider server 130 to communication device 110. In this regard, the user may utilize one or more processing applications on communication device 110 to request data from and/or process data with service provider server 130. Service provider server 130 may perform predictive analysis to determine future content or other data required by the user and may preload the data. The preloaded data may be stored to a cache or other hardware/software storage component, such as a database, of communication device 110 and/or service provider server 130.

Communication device 110 and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with service provider server 130. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains a browser application 120, a service provider device application 112, other applications 114, a cache 115, a database 116, and a communication module 118. Service provider device application 112 and other applications 114 may correspond to executable processes, procedures, and/or applications with associated hardware. In other embodiments, communication device 110 may include additional or different modules having specialized hardware and/or software as required.

Browser application 120 may correspond to one or more processes to execute software modules and associated devices of communication device 110 to provide a software application capable of retrieving information available over a network, such as the Internet, including websites and other resources available over the World Wide Web, as well as sending information over the network for processing by resources available on the network. In this regard, browser application 120 may correspond to specialized hardware and/or software utilized by a user of communication device 110 to access data available over the network, including accessing a website, retrieving website data, and processing website data. For example, browser application 120 may access a website of service provider server 130, and may utilize one or more of the services provided by the website. Browser application 120 may generate a session with service provider server 130 while use the website of service provider server 130, which may be identifier through a session identifier, cookie, or other data identifier. The session may include user information, include received user information and/or user actions by the user, such as a navigation, indication of an item of interest (e.g., placing an item in a shopping cart or checkout basket), or other user data provided or generated during the session.

Service provider server 130 may provide predictive analysis on potential future requests for content by the user, such as webpages, dynamic data, and/or pre-checkout and checkout information, as discussed herein. Thus, browser application 120 may receive and/or load preloaded data determined by service provider server 130 on a request for the preloaded data by the user through browser application 120. In order to retrieve the preloaded data, browser application 120 may receive a token from service provider server 130, as discussed herein, where the token identifies the preloaded data for use in the session when requested by the user based on a subsequent action of the user using browser application 120. Browser application 120 may communicate the token to service provider server 140 to receive the preloaded data. However, in other embodiments, the aforementioned transaction processing features may be provided on a merchant website, where browser application 120 may access the merchant website and request data from the merchant website. In this regard, browser application 120 may receive a transaction processing and/or checkout flow process provided by service provider server 130 within the merchant website, for example, an embedded flow or integrated process within the merchant website. Thus, service provider server 130 may determine potentially requested content (e.g., merchant website flow dynamic data and/or webpages for the flow) to enter to the flow within the merchant website, as discussed herein, where the aforementioned token may instead identify such content with the service provider and cause the content to be entered to the merchant website on receipt of the token by service provider server 130. Service provider server 130 may also provide transaction processing features through a dedicated application of service provider server 130 and/or another entity (e.g., a merchant), for example, through service provider device application 112.

Thus, service provider device application 112 may correspond to one or more processes to execute software modules and associated devices of communication device 110 to communicate with service provider server 130 to utilize one or more of the processes provided by service provider server 130, such as mapping or GPS, a social networking, a microblogging, a video game, a messaging or email including text messaging or instant/direct messaging, a media sharing, media content provider, and/or other services. In this regard, service provider device application 112 may correspond to specialized hardware and/or software utilized by a user of communication device 110 that accesses service provider server 130 and performs one or more actions with service provider server 130. Thus, service provider device application 112 may send data to and receive data from service provider server 130, which may be utilized within service provider device application 112 and/or output to the user using service provider device application 112. Thus, service provider device application 112 may receive content and other data from service provider server 112, which may include preloaded content for storage by communication device 110, as discussed herein. The content may correspond to application data, which may be processed by service provider device application 112 to provide output to the user associated with communication device 110.

In other embodiments, the content may correspond to online media content, including audio, visual, or audiovisual data that may be played back to the user through a media player feature of service provider device application 112. Service provider server 130 may provide predictive analysis on potential future requests for content or other data and/or requirements for the content/data, as discussed herein, and may preload data to communication device 110. In order to provide predictive analysis, service provider service application 112 may provide user actions and/or data to service provider server 130 for determination of required preloaded data, such as user actions and processes executed by the user in service provider device application 112, a location of the user determined using a GPS feature or locator of communication device 110, a travel route or destination of the user input to communication device 110, available networks to and/or a telecommunication carrier of communication device 110, and/or user input, such as interests, past purchases, past browsing or media viewing history, a wish/shopping list, and/or a playlist of media content.

Thus, in certain embodiments, the preloaded data to communication device 110 by service provider device 130 may correspond to application data for a mapping or GPS, a social networking, a microblogging, a video game, a messaging or email including text messaging or instant/direct messaging, a media sharing, or other device application, including mobile device applications. The preloaded data may be stored by service provider device application 112 to cache 115 of communication device 110 for quick local access, or may be stored to database 116 where the content may not be required for a significant period of time in order to free space within cache 115. Thus, when the user of communication device 110 performs a subsequent action that requires the preloaded data, cache 115 and/or database 116 may be accessed, and the preloaded data may be processed, output, or otherwise provided to the user. The preloaded data may be loaded even where communication device 110 does not have network connectivity or low connectivity based on the preloading to cache 115 or database 116. Thus, the preloaded data may be loaded to communication device 110 while communication device 110 has network connectivity based on service provider server 130 pinging communication device 110 for network connectivity and/or service provider device application 112 providing network connection statuses and/or network connectivity health to service provider server 130.

In other embodiments, the content may correspond to online digital media content (e.g., movies, television shows, music, virtual reality data, etc.), which may require large bandwidth or a large amount of data transfer to download/stream. In such embodiments, service provider device application 112 may provide a network status, type, or name (e.g., WiFi, LTE, a home network, work network, roaming network, cellular service network, etc.) to service provider server 130, where service provider server 130 may preload the online media content that the user may potentially view based on the network status, type, or name, as discussed herein. Service provider device application 112 may store the digital media content to cache 115 and/or database 116, which may be purchase and/or copyright protected. Thus, when the user requests to access, view, or otherwise consume the media content, service provider device application 112 may access the media content and output the media content. In this way, the media content may be viewed without requiring a network connection through accessing from cache 115 and/or database 116. In various embodiments, the media content may be required to be purchased by the user prior to consuming. The user may elect to purchase the item, and authorize a transaction to purchase the media content. Thus, purchase information, such as a digital wallet token with a transaction processor service providing a payment account and digital wallet to a user, authentication credentials for a payment account, and/or a payment instrument (e.g., credit/debit card, bank account, gift card, etc.), may be communicated to service provider server 130 for processing of a transaction to purchase the media content. In various embodiments, if no network connection is available, the payment information may be stored by service provider device application 112 for future transmission to service provider server 130 and/or the transaction processor service.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications, as well as payment and/or transaction processing applications associated with a transaction processor service. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 includes a cache 115 corresponding to a hardware and/or software component to store content and other data in a quickly available and accessible format and structure so that the data may be retrieved and served to the user associated with communication device 110 faster than performing database requests to database 116. In this regard, cache 115 may correspond to a block of memory hardware and/or software processes to store a set limited amount of data for fast retrieval when required by one or more of browser application 120 and/or service provider device application 112. Thus, cache 115 may store, from browser application 120 and/or service provider device application 112, one or more of a token associated with preloaded webpages or dynamic data used in an item checkout and purchase process, application data for an application, and/or digital media content viewable through a playback process. Cache 115 may include a process to delete unused preloaded data to cache 115 from service provider server 130, for example, after a set amount of time or when a set parameter occurs (e.g., arrival at a location, opening/closing of an application, power on/off of communication device 110, action within another application, or other parameter). In various embodiments, cache 115 may include a writing script to write used or unused data in cache 115 to longer term and/or more available storage within database 116.

Communication device 110 further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with service provider device application 112 and/or other applications 114, identifiers associated with hardware of communication device 110, or other appropriate identifiers, such as identifiers used for payment/user/device authentication or identification, which may be communicated as identifying communication device 110 to service provider server 130. Database 116 may include webpage and/or application information for browser application 120 and/or service provider device application 112, as well as preloaded content and/or data, including tokens identifying preloaded/executed content) by service provider server 130.

Communication device 110 includes at least one communication module 118 adapted to communicate with service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Service provider server 130 may be maintained, for example, by an online service provider, which may provide one or more services to users, including transaction processing, mapping or GPS, a social networking, a microblogging, a video game, a messaging or email including text messaging or instant/direct messaging, a media sharing, and/or a media content provider service. In this regard, service provider server 130 includes one or more processing applications which may be configured to interact with communication device 110 and/or another device/server to facilitate providing preloaded data to communication device 110 for use in times of high server load or demand, no or low network connectivity, and/or required purchase/payment for bandwidth or data transfers. In one example, service provider server 130 may be provided by PAYPAL®, Inc. of San Jose, Calif., USA. However, in other embodiments, service provider server 130 may be maintained by or include another type of service provider, which may provide connection services to a plurality of users.

Service provider server 130 of FIG. 1 includes a predictive caching application 140, a service provider server application 132, other applications 134, a database 136, and a network interface component 138. Service provider server application 132 and other applications 134 may correspond to executable processes, procedures, and/or applications with associated hardware. In other embodiments, service provider server 130 may include additional or different modules having specialized hardware and/or software as required.

Predictive caching application 140 may correspond to one or more processes to execute software modules and associated specialized hardware of service provider server 130 to analyze available user information for the user, as well as other users, which may include historical user actions and other information, receive a user action or other indication of a potential future action by the user using communication device 110, and determine and preload content required by the user during the potential future action. In this regard, predictive caching application 140 may correspond to specialized hardware and/or software to receive an action of the user using communication device 110 or other user information. The user information may include user browsing history, navigation events, item selections, interests, transactions and purchases by the user, shopping/wish lists, shopping cart or checkout basket information, application data requests and processed data, and/or viewed digital media content. Thus, the application may correspond to historical data for the user of a past user history. Predictive caching application 140 may utilize the user information to determine a potential future request or requirement for content on communication device 110, for example, at a future time and/or location. For example, the content may correspond to data required by communication device 110, including data for a website, checkout/payment flow, mobile application, and/or media playback application. Thus, predictive caching application 140 may determine that the user may potentially require the content or other data within an application at the future time/location.

Predictive caching application 140 may then determine whether the content is required to be preloaded so that the content will be easily retrievable from a fast cache or without requiring additional processing (e.g., API calls between applications, database lookups, and/or data processing executed by service provider server 130). If the user associated with communication device 110 may require the content or other data at the future time/location, predictive caching application 140 may pre-execute processes necessary for the content (e.g., process data, make API calls, and/or lookup data from a database) and/or preload data necessary at the future time/location to one or more caches or databases, such as cache 115, database 116, and/or cache server 135. Predictive caching application 140 may determine when the content may be required, such as within a set time period. Content that may be required by the user associated with communication device 110 may be predicted to be required within a certain amount of time, such as the next few seconds or minutes. However, other content may be required by the user at a further time in the future, including minutes or hours later. Thus, predictive caching application 140 may only preload content required by the user within the time period. Additionally, instead of a time period, the preloaded data may be required at a specific future time or range of time, for example, between 2:00-3:00 PM. The time period may be based on the user's historical data, such as a an average amount of time the user spends on a webpage or takes to checkout and purchase a product, or based on past user actions or a schedule of future user actions, for example, when the user listens to music, checks their social networking account or email, is scheduled to have a meeting at a location or travel to a location, or other information about the user's potential future actions that may request or require content from service provider server 130. In other embodiments, other user data may determine the time period and/or time when the preloaded data may be required, for example, other user patterns, which may include patterns of other users similar to the user associated with communication device 110.

In this regard, the preloaded data may correspond to content required in a website, such as on a webpage of the website. For example, the preloaded data may correspond to dynamic data or other website content for a transaction processing and checkout webpage for a transaction processor, for example, where service provider server 130 provides transaction processing services. Additionally, the transaction processing and checkout process of the webpage may be included within another webpage as an process flow, such as that of a merchant, which may include website data and/or other processes embedded or integrated in the other website. In other embodiments, the preloaded data may correspond to data within a dedicated application of service provider server 130 and/or a merchant. Predictive caching application 140 may determine that the user requires the dynamic data based on user historical data and/or an action of the user. For example, an action of the user may correspond to clicking on an item for purchase or placing the item in an electronic shopping cart. Historical data, such as past user purchases, or other user data, such as a wish list, may indicate that the user will purchase the item. Thus, predictive caching application 140 may determine that the content potentially requested by the user at a future time may correspond to dynamic data entered to the checkout webpage/flow to purchase the item. Predictive caching application 140 may perform the pre-checkout and checkout processes prior to the user engaging in checkout, such as by making the necessary API calls. Such preloaded or preprocessed content may be stored to cache 115 for fast retrieval. Additionally, the content may be associated with a token by predictive caching application 140, which may be communicated to communication device 110. On receipt of the token from communication device 110, for example, on request for the preloaded data and/or receipt of an action that requires the content, predictive caching application 140 may retrieve the preloaded data from cache 115 and provide to service provider application 132 for processing.

Predictive caching application 140 may perform and/or process the API calls and/or other dynamic data during low server processing load on service provider server 140 to make available faster during high server load. Thus, predictive caching application 140 may determine a server processing load, and may determine whether the processing load is below a minimum threshold to preload and pre-execute the required processes, API calls, webpage data, and/or dynamic data. Moreover, predictive caching application 140 may determine times of high processing load on service provider server 140, and begin performing preloading of all dynamic data for potential requests by current users in a session with service provider server 140 prior to the high processing load to spread out processing requirements over a longer time period.

However, other preloaded data may correspond to application data for an application, such as a mapping or GPS application, a social networking application, a microblogging application, a video game application, a messaging or email application including text messaging or instant/direct messaging, a media sharing application, and/or a media content provider application. Predictive caching application 140 may determine the preloaded data for the application based on past user actions and/or historical data in the application or another application, user interests, wish/shopping lists, media viewing lists, a schedule for the user, directions or a travel route/destination for the user, or other user information. Additionally, predictive caching application 140 may determine that the user may potentially require or request the content based on a location of the user and/or future location the user may visit, as well as a time of visit and/or network coverage/connectivity at the time or place. Predictive caching application 140 may retrieve the application content or other data and may transmit the application data to communication device 110 for storage in cache 115 and/or database 116, as discussed herein, where predictive caching application 140 may do so when communication device 110 has network connectivity or is connected to a specific network (e.g., WiFi for transfer of large data files). Thus, predictive caching application 140 may continually or intermittently at certain intervals ping communication device 110 for network connectivity, signal strength, and/or type of network connection. Additionally, predictive caching application 140 may either provide copyright protection, such as DRM protection, and/or purchase locking of digital media content prior to transmission to communication device 110. Once transmitted to communication device 110, one or more applications of communication device 110 may access the cached or stored data and execute the data, as discussed herein.

Service provider server application 132 may correspond to one or more processes to execute software modules and associated specialized hardware of service provider server 130 to provide one or more services to the user associated with communication device 110 through communication device 110, where the services may include data and/or content potentially used by the user at a future time or location that may be preloaded prior to use. In this regard, service provider server application 132 may correspond to specialized hardware and/or software to provide a transaction processing and payment, a mapping or GPS, a social networking, a microblogging, a video game, a messaging or email including text messaging or instant/direct messaging, a media sharing, and/or a media content provider service.

Service provider server application 132 may be used to provide a payment for a transaction to a merchant, for example, between communication device 110 and merchant device 120. Service provider server application 132 may debit an account of the user and provide the payment to an account of the merchant. Service provider server application 132 may also be used to provide transaction histories for processed transactions. Such service may be provided through a website and/or dedicated application, and may send and/or receive data with communication device 110. Thus, service provider server application 132 may provide a website with one or more webpages having processes for the service, or may correspond to a server-side application that may interact with a dedicated application of service provider server application 132 on communication device 110. Thus, predictive caching application 140 may determine a potential future request for content from service provider server application 132, as discussed herein, and provide the content to communication device 110. Service provider server application 132 may receive one or more requests for data and/or to process data, such as dynamic website data, from predictive caching application 140 and provide the data to predictive caching application 140 for storage in one or more of cache 115, database 116, and/or cache server 135.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130, where the user or other users may interact with the GUI to more easily view and communicate information. In various embodiments, other applications 134 may include connection and/or communication applications, which may be utilized to communicate information to over network 150.

Service provider server includes a cache server 135 corresponding to a hardware and/or software component to store content and other data in a quickly available and accessible format and structure so that the data may be retrieved and served to the user associated with communication device 110 faster than performing database requests to database 136 by service provider server application 132. In this regard, cache server 135 may correspond to a block of memory hardware and/or software processes on or associated with service provider server 130 to store a set limited amount of data for fast retrieval when required by communication device 110. For example, cache server 135 may be accessed by predictive analysis application 140 on receipt of a token identifying content/data stored to cache server 135, such as checkout webpage/flow content or other data for a checkout process to purchase an item, where the content/data has previously been generated and processed using predictive cache application 140 and service provider server application 132. Thus, cache server 135 may be internal to service provider server 130 and utilize hardware and/or software of service provider server 130. In other embodiments, cache server 135 may correspond to a separate computing device, such as a separate dedicated network cache server used to store webpage data, dynamic data, and/or other content locally on cache server 135 and allow for fast retrieval of the content by placing the content is local storage. Cache server 135 may include a process to delete unused preloaded data to cache 115 from service provider server 130, for example, after a set amount of time or when a set parameter occurs (e.g., end of session by a user and/or removal of an item in the preloaded data from an indication of purchase by the user). In various embodiments, cache server 135 may include a writing script to write used or unused data in cache server 135 to longer term and/or more available storage within database 136.

Additionally, service provider server 130 includes database 136. As previously discussed, the user may establish one or more digital wallets and/or accounts with service provider server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to service provider server 130, e.g., from communication device 110, one or more digital wallets and/or payment accounts belonging to the users may be found. Database 136 may also store the user information, including historical user information, user actions, user locations or schedule, user travel or destination, user interests and/or indications of item/content for purchase/viewing, or other information that may be used to determine a potential future request for content. The user information may also correspond to a plurality of users, which may be used to determine similar users and those user's future actions after performing some online action, such as the same or similar online action to one performed by the user. Additionally, a determined request or requirement for content at some future time may be stored to database 136.

In various embodiments, service provider server 130 includes at least one network interface component 138 adapted to communicate with communication device 110 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2B:
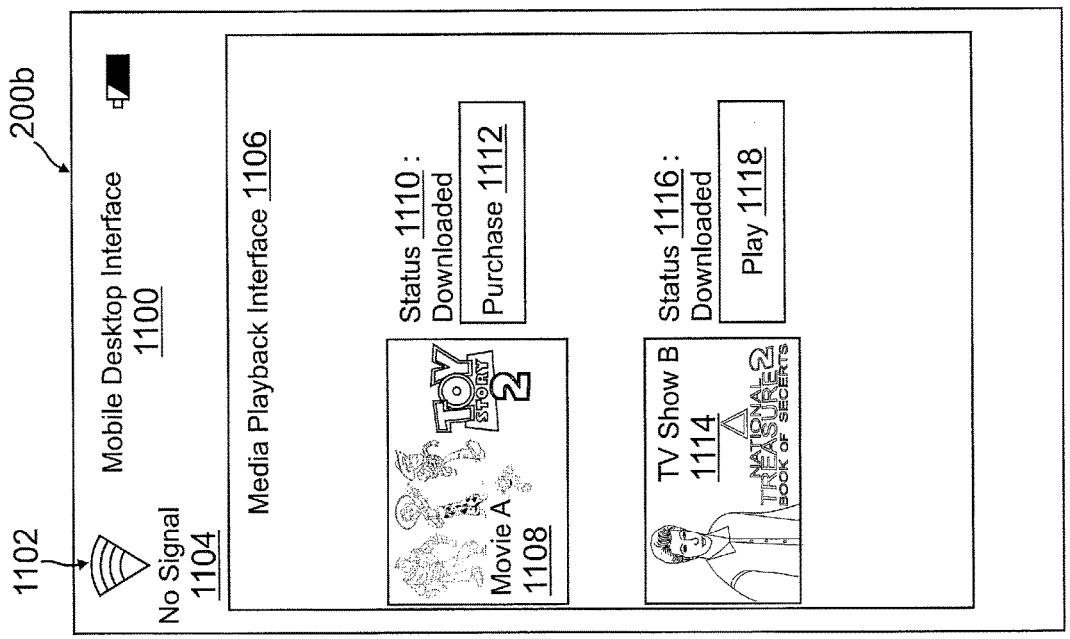
FIG. 2B is an exemplary mobile desktop interface for displaying of digital media content preloaded to a device database during a high bandwidth network connection or free data transfer network connection, according to an embodiment.
Figure 2A:
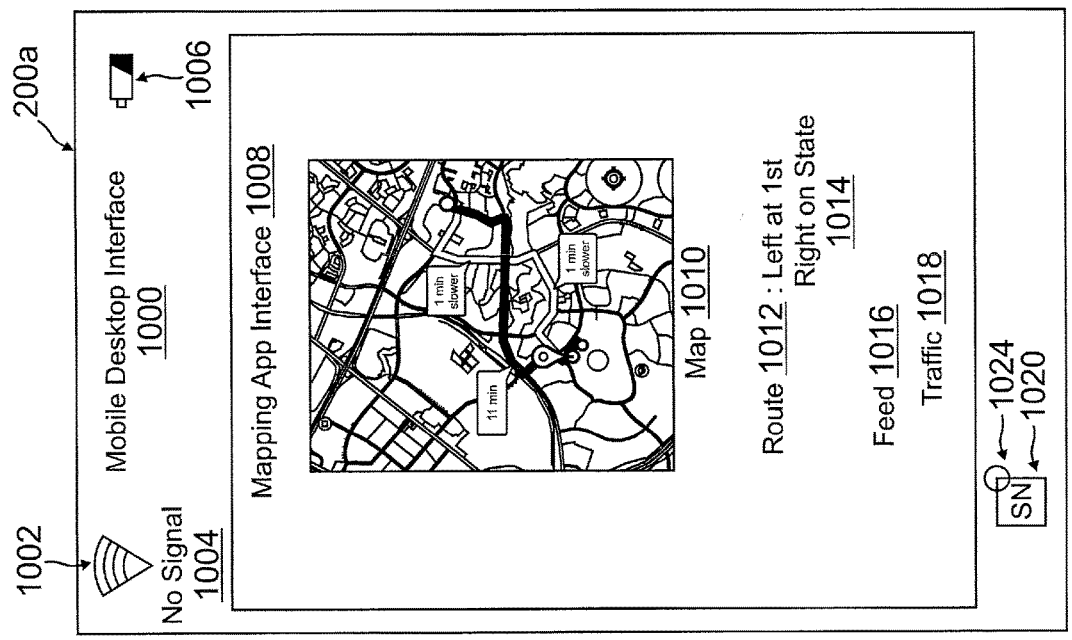
FIG. 2A is an exemplary mobile desktop interface for displaying of application data preloaded to a device cache prior to loss of network connectivity, according to an embodiment.

FIG. 2A is an exemplary mobile desktop interface for displaying of application data preloaded to a device cache prior to loss of or limited network connectivity, according to an embodiment. Environment 200a includes a mobile desktop interface 1000 of a communication device, where the communication device corresponds generally to the described features, processes, and components of communication device 110 in environment 100 of FIG. 1. In this regard, a user utilizing the communication device may view mobile desktop interface 1000 on the communication device, where mobile desktop interface 1000 corresponds to an interface of an operating system having one or more application windows, such as service provider device application 112 of communication device 110 in environment 100 of FIG. 1.

In this regard, mobile desktop interface 1000 includes a network connectivity indicator 1002, where network connectivity indicate 1002 shows no available network connection and displays a no signal message 1004 to a user viewing mobile desktop interface 1000. Moreover, mobile desktop interface 1000 may further include a battery level indicator 1006, where the battery level may be shown to the user and used to determine available device resources to output data to the user. Mobile desktop interface may further have an open and executing mapping application corresponding to a mapping app interface 1008, where mapping app interface 1008 includes application data displayed through mapping app interface, such as a map 1010, route directions 1012 (including audio directions), and/or a visual route shown on map 1010. Mapping app interface 1008 may further include a feed 1016, such as traffic 1018. Additionally, mobile desktop interface 1000 may have a social network application icon 1020 having a badge 1024 indicating new application data. However, as the communication device for mobile desktop interface 1000 does not have a network connection shown through network connectivity indicator 1002, the content displayed through mapping app interface 1008 may be preloaded to the communication device, for example, to a device cache, and retrieved from the cache to display mapping app interface 1008 and the associated data. Moreover, social networking application icon 1020 may be selected to display the data for badge 1024, which may also be stored to the cache and served even with no signal message 1004 displaying for network connectivity indicator 1002.

FIG. 2B is an exemplary mobile desktop interface for displaying of digital media content preloaded to a device database during a high bandwidth network connection or free data transfer network connection, according to an embodiment. Environment 200b includes a mobile desktop interface 1100 of a communication device, where the communication device corresponds generally to the described features, processes, and components of communication device 110 in environment 100 of FIG. 1. In this regard, a user utilizing the communication device may view mobile desktop interface 1100 on the communication device, where mobile desktop interface 1100 corresponds to an interface of an operating system having one or more application windows, such as service provider device application 112 of communication device 110 in environment 100 of FIG. 1.

In this regard, a network connectivity indicator for mobile desktop interface 1100 display network connectivity, and shows that the communication device displaying mobile desktop interface 1100 has an LTE connection 1104 to an LTE network. However, LTE networks are generally associated with mobile telecommunication carriers and providers, where use of the LTE network to transfer data may be restricted in bandwidth usage and/or limited to set amounts of data transfer, including payment for data transfer and additional or penalty fees for overuse of a set or purchased data transfer amount. Thus, where a user may wish to utilize media playback interface 1106 to view media, such as a television show or movie through download of the media content or stream of the media content, the user may use valuable data transfer amounts using LTE connection 1104. Instead, mobile desktop interface 1100 of environment 200b provides a media playback interface 1106 having preloaded digital media content prior to use of LTE connection 1104, such as during a higher bandwidth of free/low cost data transfer WiFi network at a home, work, or other location, which may be stored to a cache or database associated with the communication device displaying mobile desktop interface 1100. Media playback interface 1106 includes a movie A 1108 having a status 1110 of "downloaded" to indicate that the user is not required to use LTE connection 1104 to view movie A 1108. However, movie A 1108 may require to complete purchase process 1112 to purchase movie A 1108, and thus, movie A 1108 may be purchase locked until confirmation of purchase and completion of purchase process 1112. In contrast, a TV show B 1114 has a similar status 1116 of "downloaded" indicating no use of LTE connection 1104 is required. However, TV show B 1114 has a play process 1118 that does not require the user to complete a purchase process, and the user may immediately view TV show B 1114 through selection of play process 1118. Movie A 1108 and/or TV show B 1114 may further be DRM protected to prevent unauthorized sharing of the downloaded digital media content.

FIG. 3A is an exemplary application environment displaying application data for preloaded dynamic data for transaction processing within a website checkout interface, according to an embodiment. Environment 300a of FIG. 3A includes predictive caching application 140 corresponding generally to the processes and features discussed in reference to predictive caching application 140 in environment 100 of FIG. 1. In this regard, predictive caching application 140 in environment 300a may execute processes to preload content request for a webpage and/or transaction processing and checkout flow for a transaction processor service, such as one provided by service provider server 130 in environment 100 of FIG. 1.

Thus, predictive caching application 140 include various data used to determine a potential future request for content by a user during a session between the user and a website, including a website of the transaction processor service or a website of a merchant having embedded or integrated processes for the transaction processor service. For example, predictive caching application 140 may access website data 2000 in order to determine a potential future action and/or request for content from a user. Website data 2000 includes sessions 2002 for users utilizing a website, such as a user A session 2004 for a user. User A session 2004 may include data from the user utilizing a website associated with website data 2000. Thus, user A session 2004 includes an identifier 2006 for the user and/or the user's device, as well as actions 2008 taken on the website, such as indications of items of interest through selection of the item or adding the item to a shopping cart or wish list, navigations, and/or processing requests. Actions 2008 may therefore include an item of interest 2010 and past actions 2011 that indicate whether the user may purchase item of interest 2010. Utilizing actions 2008 and/or other data, potential actions 2012 may be determined. For example, one of potential actions 2012 may include a checkout 2014 for item of interest 2010. Thus, predictive caching application 140 may determine preloaded checkout data 2016, which may be stored to a server cache or other storage and be associated with token 2018 communicated to the user's device for retrieval of preloaded checkout data 2016.

Additionally, predictive caching application 140 may include data to determine a processing load on the system to predict a time to preload content, including the aforementioned website/flow dynamic data used in checkout 2014, such as preloaded checkout data 2016. In this regard, predictive caching application may determine a processing load 2020 using at least website traffic 2022, such as users visiting a website and/or interactive/navigating on the website, and checkout requests 2024, which may correspond to current users checking out and purchasing items, which may be processing intensive due to the number of API calls and data processing requests. Predictive caching application 140 may further store user data 2024 for use in performing predictive analysis on potential future requests for data, which may include past user transactions 2026 and/or past user checkout actions 2028 using to determine potential actions 2012.

FIG. 3B is an exemplary system environment having a service provider server executing a predictive analysis application for determination of preloaded data required by a user to reduce processing downtime by the user's device, according to an embodiment. FIG. 3 includes service provider server 130 corresponding generally to service provider server 130 discussed in reference to environment 100 of FIG. 1.

Service provider server 130 includes predictive caching application 140 corresponding generally to the processes and features discussed in reference to account predictive caching application 140 in environment 100 of FIG. 1. In this regard, predictive caching application 140 includes data necessary to preload data to a cache or database, which may be provided to a user during high server load, no network connectivity, and/or without using available bandwidth or data transfer purchases. Thus, predictive caching application 140 includes a predictive analysis engine 2100 to determine one or more potential future requests or requirements for content from service provider server 140 or another content provider. For example, predictive analysis engine may process user information 2102 to determine potential future requirements 2110 and generate preloaded data 2122 for potential future requirements 2110. Thus, user information 2102 includes one or more of a location 2104 for a user (e.g., a current and/or destination location), website actions 2106 by the user on a website, and/or past viewing history 2108 of the user for media content consumed by the user. Utilizing the aforementioned information, potential future requirements 2110 may be determined.

For example, location 2104 may be used to determine application data 2112 required by the user, for example, if the user may perform an application action at a future time and require application data, however, location 2104 provides low or no network connectivity. Similarly, website actions 2106 may be used to determine website data 2114 that may be required by the user, such as checkout flow data 2116, which may be required at a time of high server demand causing lag in delivery of checkout flow data 2116. Moreover, past viewing history 2108 may be used to determine media content 2118 that the user may potentially wish to watch at a future time, which may include a purchase requirement 2120, however, the user may not be able to stream or download media content 2118 or be required to pay for bandwidth to stream/download media content 2118. Thus, predictive caching application 140 may determine preloaded data for potential future requirements 2110. For example, preloaded data 2122 may include application data 2112 that is stored to a device cache 2124. Checkout flow data 2116 may be stored to a cache server 2126 for retrieval using a token identifying checkout flow data 2116. Moreover, media content 2118 may be stored to a device database for playback, which may include providing purchase protection 2130 in response to purchase requirement 2120.

Figure 4:
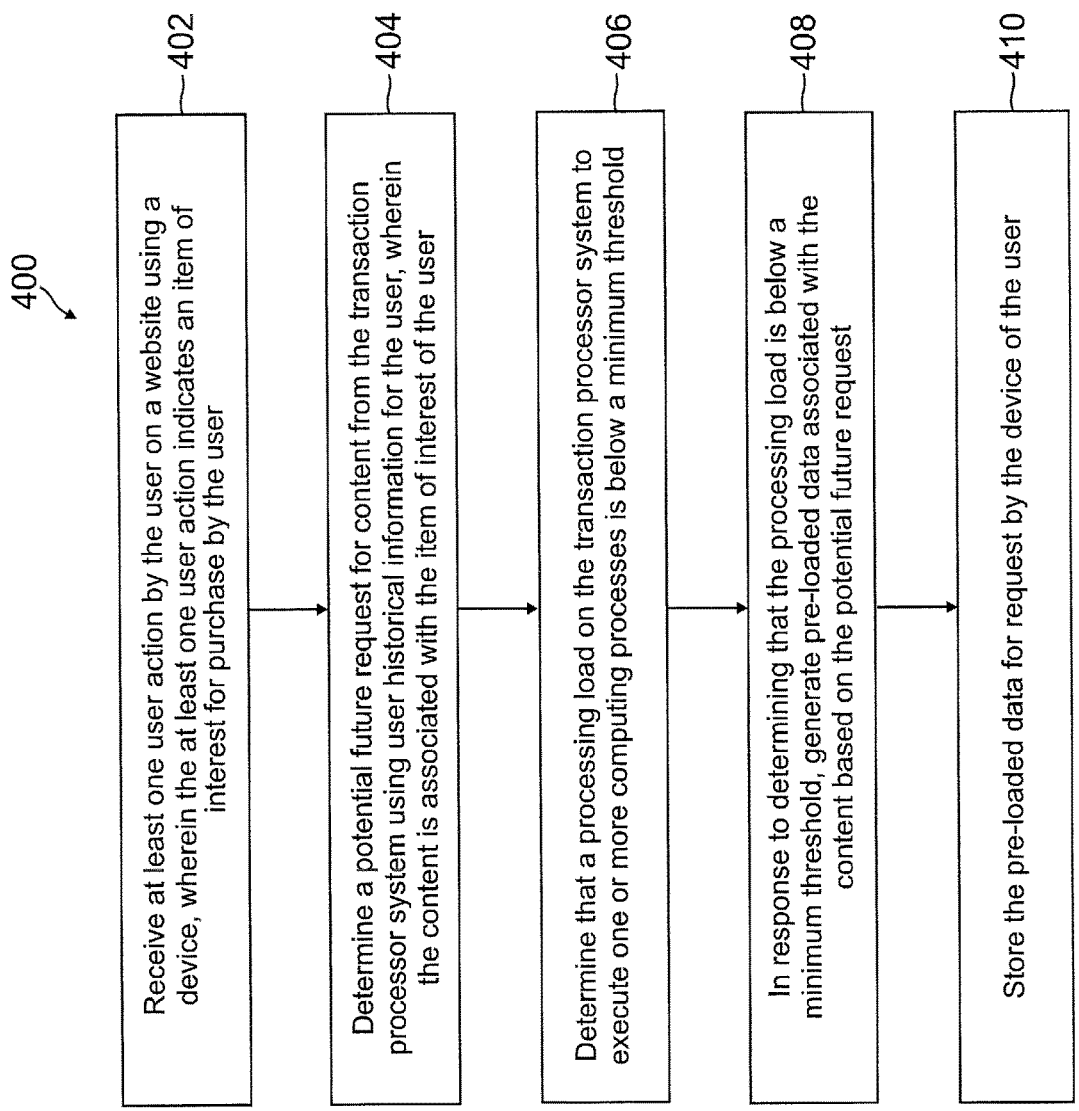
FIG. 4 is a flowchart of an exemplary process for predictive analysis of computing patterns for preloaded data to reduce processing downtime, according to an embodiment.

FIG. 4 is a flowchart of an exemplary process for predictive analysis of computing patterns for preloaded data to reduce processing downtime, according to an embodiment. Note that one or more steps, processes, and methods described herein may be omitted, performed in a different sequence, or combined as desired or appropriate.

At step 402, at least one user action by the user on a website using a device is received, wherein the at least one user action indicates an item of interest for purchase by the user. At step 404, a potential future request for content from the transaction processor system is determined using user historical information for the user, wherein the content is associated with the item of interest of the user. The historical information may further be for a plurality of other users, wherein the historical information further comprises past user actions by the user and the plurality of users on the website. Thus, the potential future request may be determined based on a subsequent action taken by the plurality of users on the website after performing at least one user action by the user. The historical information may also comprise at least one of a purchase history for the user, past actions on the website by the user, past items of interest of the user, a shopping list of the user, or a wish list of the user. In various embodiments, determining the potential future request may comprise determining at least one other user similar to the user from the plurality of other users using the past user actions, and determining the potential future request based on a subsequent action taken by the at least one other user after performing the at least one user action.

It is determined that a processing load on the transaction processor system to execute one or more computing processes is below a minimum threshold, at step 406. In response to determining that the processing load is below a minimum threshold, pre-loaded data associated with the content is generated based on the potential future request, at step 408. The content may comprise a transaction processor checkout flow for the transaction processor system on the website, wherein the website comprises one of a transaction processor website for the transaction processor system for processing a transaction for the item of interest with a merchant or a merchant website for the merchant using the transaction processor system for sale of the item of interest. Thus, the preloaded data may comprise dynamic website data for the transaction processor checkout flow pre-executed based on the item of interest, wherein the dynamic website data is associated with a token provided to the device, and wherein the dynamic website data is inserted to the transaction processor checkout flow on the website with static website data on receipt of the token from the device.

Thus, the token may be received from the device at a future time, and the dynamic website data may be entered to the transaction processor checkout flow on a webpage of the website with the static website data for the webpage. In various embodiments, generating the preloaded data comprises generating the dynamic website data, and wherein generating the dynamic website data may comprise performing API calls between an item sales application of the merchant and the transaction processor checkout flow while the processing load is below the minimum threshold. In various embodiments, the dynamic website data comprises at least one of user information for the user entered to the transaction processor checkout flow, financial information for the user entered to the transaction processor checkout flow, merchant for the merchant information entered to the transaction processor checkout flow, or item information for the item of interest entered to the transaction processor checkout flow. Thus, at step 410, the pre-loaded data is stored for request by the device of the user. Storing the preloaded data may comprise storing the dynamic website data to one of a cache of the transaction processor system and a cache server associated with the transaction processor system.

Figure 5:
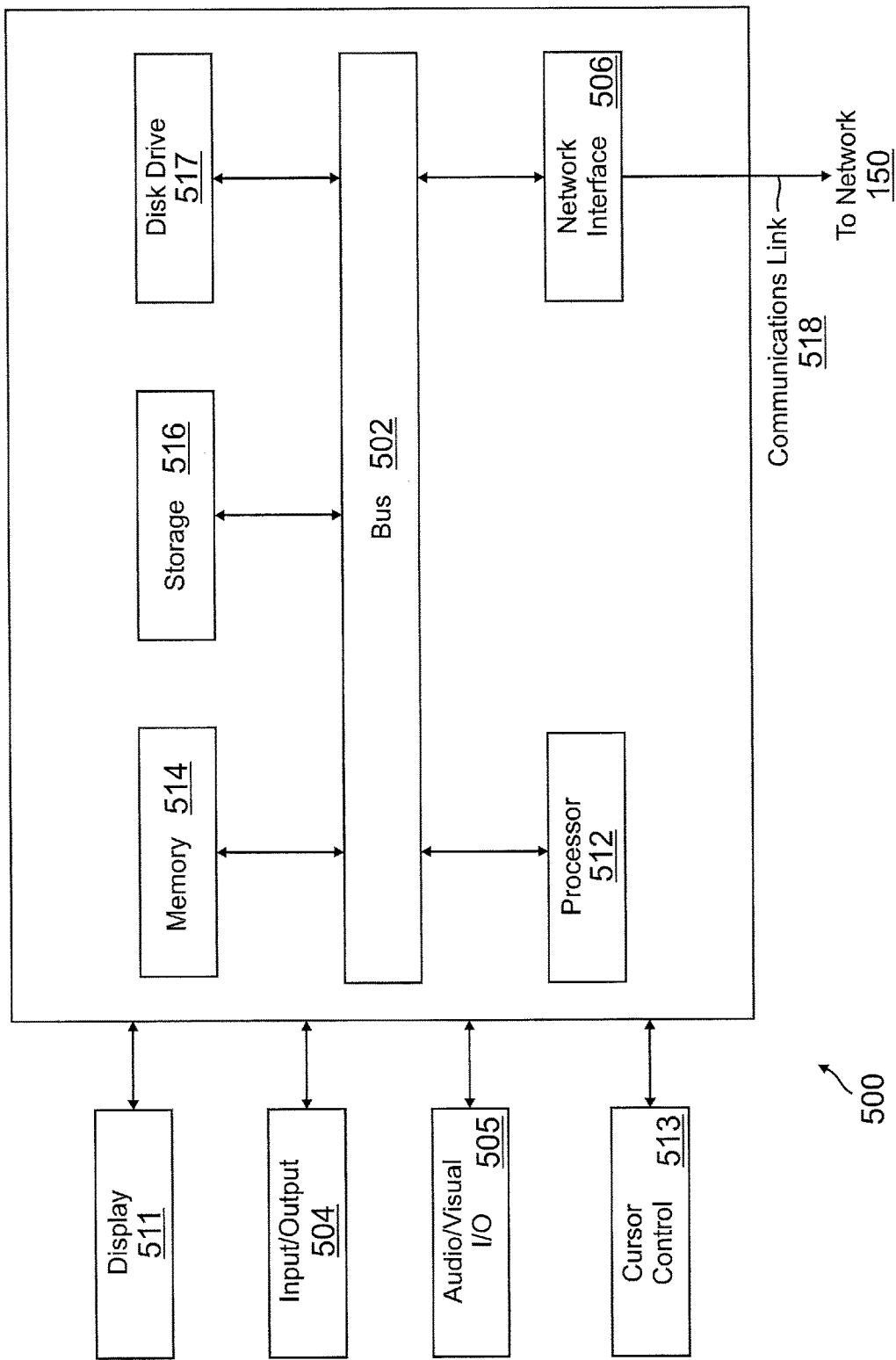
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Flaying thus described embodiments of the present disclosure, persons of ordinary skill in the art will recognize that changes may be made in form and detail without departing from the scope of the present disclosure. Thus, the present disclosure is limited only by the claims.

What is claimed is:

1. A transaction processor system comprising:
    a non-transitory memory; and
    one or more hardware processors coupled to the non-transitory memory and configured to read instructions from the non-transitory memory to cause the transaction processor system to perform operations comprising:
        receiving at least one user action by a user through a website or a mobile application using a device, wherein the at least one user action indicates an item of interest for purchase by the user;
        determining a potential future request for a transaction checkout flow with the transaction processor system for the item based on user historical information for the user;
        determining that a processing load on the transaction processor system to execute one or more computing processes is below a minimum threshold;
        in response to determining that the processing load is below the minimum threshold, retrieving item data for the item and user data for the user required for processing a transaction for the item in the transaction checkout flow prior to incurring additional processing load on the transaction processor system;
        generating dynamic data for the transaction checkout flow based on the potential future request, the item data, and the user data, wherein the dynamic data depends on input to the transaction checkout flow, and wherein the dynamic data is separate from static data with a content delivery network; and
        storing the dynamic data for a subsequent request by the device of the user.

2. The transaction processor system of claim 1, wherein the user historical information comprises information for a plurality of users, and wherein the user historical information further comprises past user actions by the user and the plurality of users conducted through the website or the mobile application.

3. The transaction processor system of claim 2, wherein the potential future request is determined based on a subsequent action conducted by the plurality of users through the website or the mobile application after previously performing a matching action to the at least one user action.

4. The transaction processor system of claim 2, wherein determining the potential future request comprises:

determining one of the plurality of users previously performed a matching action to the at least one user action based on the past user actions; and determining the potential future request based on a subsequent action conducted by the one of the plurality of users after previously performing the matching action.

5. The transaction processor system of claim 1, wherein the user historical information comprises at least one of a purchase history for the user, past actions on the website or the mobile application by the user, past items of interest of the user, a shopping list of the user, or a wish list of the user.

6. The transaction processor system of claim 1, wherein the transaction checkout flow for the transaction processor system is integrated with the website or the mobile application for processing a sale of the item of interest.

7. The transaction processor system of claim 6, wherein processes for providing the dynamic data in the transaction checkout flow are pre-executed, wherein the dynamic data is associated with a token provided to the device, and wherein the dynamic data is inserted to the transaction checkout flow with the static data on receipt of the token from the device.

8. The transaction processor system of claim 7, wherein generating the dynamic data comprises performing API calls between an item sales application of a merchant and the transaction checkout flow while the processing load is below the minimum threshold.

9. The transaction processor system of claim 7, wherein the operations further comprise:
receiving the token from the device; and
providing the dynamic data to the transaction checkout flow on a page of the website or an interface of the mobile application with the static data.

10. The transaction processor system of claim 7, wherein the dynamic data is stored on one of a cache of the transaction processor system or a cache server associated with the transaction processor system.

11. The transaction processor system of claim 7, wherein the dynamic data comprises at least one of user information for the user, financial information for the user, merchant information, or item information for the item of interest.

12. A method comprising:
receiving user information for a user using a device of the user, wherein the user information comprises at least a location of the user,
determining a predictive requirement for dynamic data required by a transaction checkout flow for processing a transaction for an item through an application executing on the device at a future time based on the location and past user history associated with the application, wherein the application of the device requires a network connection to process the dynamic data in the transaction checkout flow at the future time, wherein the dynamic data depends on input to the transaction checkout flow, and wherein the dynamic data is separate from static online content with a content delivery network;
determining a network connectivity rating for the network connection at the future time;
determining that the network connectivity rating at the future time is below a minimum required rating;
in response to determining that the network connectivity rating is below the minimum required rating, retrieving item data for the item and user data for the user required for processing the transaction through the transaction checkout flow;
generating the dynamic data for the transaction checkout flow based on the item data and the user data; and
loading, using the network connection, the dynamic data to a cache of the device prior to the future time.

13. The method of claim 12, wherein the network connectivity rating at the future time indicates no network connectivity for the network connection at the future time.

14. The method of claim 13, wherein the dynamic data is associated with static online content comprising one of map data for a mapping feature of the application, social networking data displayable using the application, microblogging data displayable using the application, audio data output using the application, video data output using the application, audiovisual data output using the application, or video game data processed using the application, and wherein the static online content is further loaded to the cache prior to the future time.

15. The method of claim 14, wherein the receiving the user information further comprises accessing historical information for network usage for a plurality of users at the location of a future location for the user associated with the future time, and wherein the determining that the network connectivity rating at the future time is below the minimum required rating further uses the historical information.

16. The method of claim 14, wherein the receiving the user information further comprises accessing carrier coverage data for the location of a future location for the user associated with the future time, and wherein the determining that the network connectivity rating at the future time is below the minimum required rating further uses the carrier coverage data.

17. A non-transitory machine-readable medium having stored thereon machine-readable instructions executable to cause a machine to perform operations comprising:
receiving input to a checkout flow through one of a website or a mobile application using a device, wherein the input comprises an item for purchase through the one of the website or the mobile application, and wherein the checkout flow is provided by a transaction processor associated with the machine;
determining that a processing load of the transaction processor is below a minimum threshold;
determining account data for an account utilized by the device with the transaction processor, wherein the account data is required for processing the checkout flow for the item;
generating dynamic data for the checkout flow based on the input and the account data prior to incurring additional processing load on the transaction processor, wherein the dynamic data is variable based on at least one of the input or the account data, and wherein the dynamic data is separate from static data with a content delivery network; and
storing the dynamic data for the checkout flow.

18. The non-transitory machine-readable medium of claim 17, wherein the item comprises digital media for playback by the device, and wherein the digital media is provided by a content delivery network.

19. The non-transitory machine-readable medium of claim 18, wherein the digital media requires a purchase through the checkout flow for the playback of the digital media, wherein the digital media is protected from playback or copying without the purchase, and wherein the operations further comprise:
processing the checkout flow using the dynamic data to complete the purchase of the digital media;
in response to the determining that a processing load of the transaction processor is below a minimum threshold, storing the digital media on the device; and unlocking the digital media for at least one of playback or copying on the device.

20. The non-transitory machine-readable medium of claim 19, wherein digital media content comprises one of movie data, music data, television show data, video game data, or virtual reality data.

\* \* \* \* \*

UNITED STATES PATENT AND TRADEMARK OFFICE
CERTIFICATE OF CORRECTION

PATENT NO. : 10,264,050 B2
APPLICATION NO. : 15/284333
DATED : April 16, 2019
INVENTOR(S) : Michael Charles Todasco et al.

It is certified that error appears in the above-identified patent and that said Letters Patent is hereby corrected as shown below:

In the Specification

In Column 24, Line 16, change "Flaying" to --Having--.

In the Claims

In Claim 12, Column 25, Line 44, change "user," to --user;--.

Signed and Sealed this
Twenty-fifth Day of June, 2019

Andrei Iancu
*Director of the United States Patent and Trademark Office*